Figure 1:
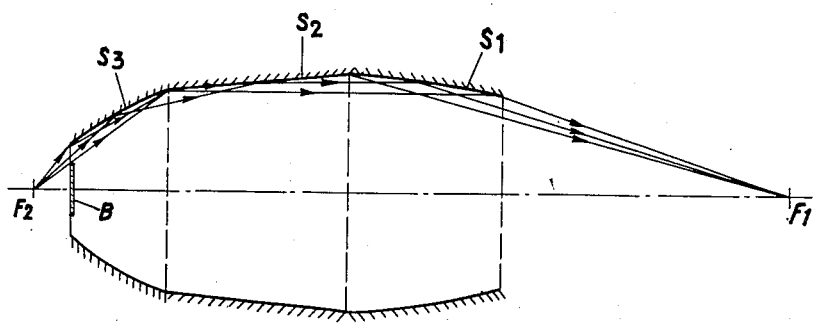

United States Patent Office 2,766,385
Patented Oct. 9, 1956

2,766,385

OPTICAL IMAGE-FORMING PLURAL REFLECTING MIRROR SYSTEMS

Günther Herrnring, Hamburg-Fuhlsbuttel, and Walter Weidner, Mannheim, Germany

Application September 8, 1953, Serial No. 378,936

Claims priority, application Germany September 11, 1952

3 Claims. (Cl. 250—53)

This invention is concerned with a reflecting mirror system comprising a plurality of surfaces only part of which are aspherical surfaces.

Images have been previously produced with X-rays by total reflection, using mirror systems comprising exclusively aspherical surfaces, as described in copending application Serial No. 288,910, filed May 20, 1952. If such a system comprises only two mirrors, only ray beams or bundles with small aperture angle can be handled and the aperture of such system is accordingly limited. A larger aperture would however be very desirable at a given wave length so as to increase the resolving power.

In order to be able to use in the image formation larger aperture angles, it would be necessary to increase the number of the reflecting surfaces. The use of a greater number of reflecting surfaces would make it possible to handle due to plural reflection ray beams or bundles of larger aperture in spite of the limitation of the angle of incidence upon the individual mirrors which is with X-rays unavoidable. However, the production of reflecting surfaces with aspherical curvature causes great difficulties and the increase in the number of aspherical reflecting surfaces, for the purpose of increasing the aperture, accordingly constitutes an unsatisfactory solution.

The invention is based on the recognition of the fact that it is possible to obtain achromatic, aplanatic images at finite object and image spacing and with larger aperture, even if of the $n$ surfaces of a plural mirror system ($n>2$) only two surfaces have an aspherical curvature while the remaining $n-2$ reflecting surfaces are simple rotation surfaces, that is, cylindrical or cone surfaces, with a straight line as a producer. Such cylindrical or cone surfaces can be produced much easier than surfaces with aspherical curvature.

It is in the calculation of the mirror systems according to the invention possible to obtain solutions, proceeding from the desired aplanatic properties, which satisfy for each individual ray the sine condition as well as the requirement as to the constancy of the optical paths, the $n-2$ nonaspherical mirror surfaces being thereby arrived at by simple predetermined analytical functions.

A mirror system of the above indicated kind when used for example as an objective with high magnification, offers among others the advantage of a greater aperture with ease of production; when used as a condenser, the system makes it possible to produce a true dark-field illumination.

The interposed $n-2$ simple mirror surface, for example, cylindrical or cone surfaces, serve primarily the propagation of the rays and therefore affect the image-forming properties of the system only indirectly. In the mathematical treatment of the corresponding plural mirror systems, these surfaces moreover permit proceeding from an equivalent two-mirror system with exclusively aspherical surfaces, such as is described in the previously mentioned copending application Serial No. 288,910. It is thereby only necessary to apply Abbe's sine condition in a modified form.

Figure 2:
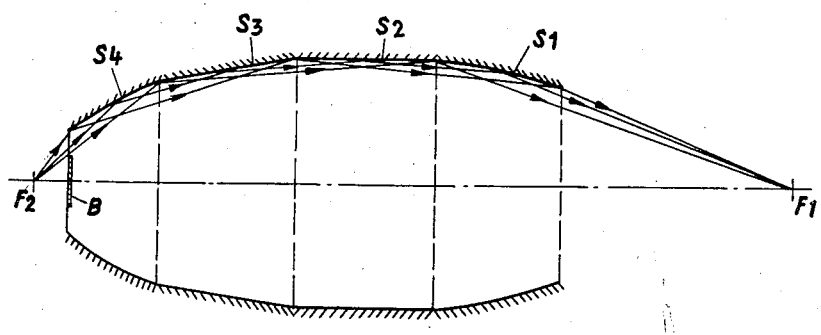

The invention will now be described with reference to the accompanying diagrammatic drawings, in which Fig. 1 shows an example of a new plural mirror objective comprising an odd number $n=3$ of mirrors; and Fig. 2 illustrates another example comprising an even number $n=4$ of mirrors.

Referring now to Fig. 1, $S_1$, $S_2$ and $S_3$ represent sections of individual mirror surfaces shown relative to the plane of the drawing, $S_2$ extending in a straight line. The reflecting mirror surfaces are obtained either as rotation surfaces, by rotation of the curve flights $S_1$, $S_2$, $S_3$ about the axis $F_1$—$F_2$, or as cylinder surfaces (in the case of the aspherical mirrors $S_1$ and $S_3$) or planes (in the case of the cone surface $S_2$), respectively, for which the curve flights $S_1$, $S_2$, $S_3$ form the guide lines along which the producers, standing, for example, perpendicular to the plane of the drawing, are shifted parallel to themselves. Several cylinder surfaces or planes obtained in this manner are disposed centered about the axis $F_1$—$F_2$, in polygon form, whereby it is possible, by the use of a suitable number of cylinder surfaces or planes, to approach the rotation body as desired and to improve the optical properties of the system. The sectional curves are determined by maximal satisfaction of the sine requirement and the constancy of the sum of the length of the optical paths. The central rays are blocked out by the shutter B. The ray path for one point of the axis is apparent from the plural rays indicated in the drawing.

The embodiment shown in Fig. 2 assumes a number $n=4$ of mirrors. The plural mirror system is obtained in this case in an analogous manner from the curve flights $S_1$ to $S_4$, wherein $S_2$ and $S_3$ extend in straight lines. The central ray path is again blocked out by the shutter B. Several rays are shown in the drawing to indicate the ray path for one point of the axis $F_1$—$F_2$.

The new optical systems are not limited for use with X-rays, in connection with which they afford great resolving power, due to their great apertures, but are in view of their good optical properties likewise adapted for use with neutrons and for other corpuscular radiation, insofar as they exhibit optical and especially total reflection.

The mirror surfaces employed in the new system may be produced in several diverse ways. As described in the previously mentioned prior application Serial No. 288,910, one of such ways may be by machining by cutting or non-cutting tools; mirrors for higher requirements, so far as the surface properties are concerned, may be produced by elastic deformation of bodies whose surfaces suitably approach the desired form or by defined vaporization or sedimentation of materials upon suitable carriers with correspondingly formed surfaces; the mirrors may also be produced galvanoplastically; surfaces with slight curvatures as they are especially required in the X-ray field may be produced with the necessary accuracy in the case of bicrystals by means of the piezoelectric effect, or, in the case of ferromagnetic materials by magnetostriction; and thermal deformation may be employed in the case of bicrystals for giving the mirror surfaces the final form.

Changes may be made within the scope and spirit of the appended claims.

We claim:

1. Reflecting mirror system for producing by the use of X-rays strictly aplanatic, achromatic images comprising a plurality of $n>2$ reflecting rotation surfaces including polygonal surfaces, said polygonal surfaces being formed by cylindrical strips polygonally arranged about the optical axis, means for blocking out the nonreflecting axially centrally extending ray path, the configuration of the surfaces of said $n$ mirrors being calculated by applying analytic functions proceeding from the requirements for strictly aplanatic achromatic image-forming, so as to determine $n-2$ of said mirrors by simple functions and especially by functions representing second degree surfaces whose meridian sections are straight lines.

2. The reflecting mirror system as defined in claim 1, wherein at least one of said $n$ mirrors is formed by a plurality of cylindrical strips with aspherical curvature and wherein at least one of said $n$ mirrors is formed by a plurality of plane strips, said strips being obtained by parallel displacement of their respective producer along the calculated curvature and plane, respectively, the totality of said strips in each individual mirror of said system forming a closed polygonal surface surrounding the optical axis thereof.

3. The reflecting mirror system according to claim 1, wherein are employed rotation surfaces determined by rotation of the calculated curves of the mirror surfaces about the system axis.

References Cited in the file of this patent

UNITED STATES PATENTS

| | | |
|---|---|---|
| 804,996 | Anthony | Nov. 21, 1905 |
| 1,763,630 | Hopkins | June 10, 1930 |
| 1,865,441 | Mutscheller | July 5, 1932 |
| 2,198,014 | Ott | Apr. 23, 1940 |
| 2,457,253 | Martin | Dec. 28, 1948 |
| 2,557,662 | Kirkpatrick | June 10, 1951 |
| 2,653,249 | Harker | Sept. 22, 1953 |

FOREIGN PATENTS

| | | |
|---|---|---|
| 29,282 | Great Britain | of 1909 |
| 1,055,368 | France | Oct. 14, 1953 |